US012638145B2

(12) United States Patent
Davis et al.

(10) Patent No.: US 12,638,145 B2
(45) Date of Patent: May 26, 2026

(54) HAZARD LIGHT

(71) Applicant: TECHTRONIC CORDLESS GP, Anderson, SC (US)

(72) Inventors: Tyler E. Davis, Greenville, SC (US); Matthew T. Mandel, Anderson, SC (US); Victoria Veach, Greenville, SC (US); Jacob Wagner, Greenville, SC (US); Ryan Altenburger, Greenville, SC (US); Joel Fleming, Anderson, SC (US)

( * ) Notice: Subject to any disclaimer, the term of this patent is extended or adjusted under 35 U.S.C. 154(b) by 0 days.

(21) Appl. No.: 19/009,473

(22) Filed: Jan. 3, 2025

(65) Prior Publication Data

US 2025/0216040 A1 Jul. 3, 2025

Related U.S. Application Data

(60) Provisional application No. 63/617,108, filed on Jan. 3, 2024.

(51) Int. Cl.
*F21L 4/04* (2006.01)
*F21L 4/02* (2006.01)
(Continued)

(52) U.S. Cl.
CPC .................................... *F21L 4/04* (2013.01); *F21L 4/02* (2013.01); *F21V 17/02* (2013.01);
(Continued)

(58) Field of Classification Search
CPC ... F21L 4/04; F21L 4/02; H05B 47/17; H05B 45/10; F21V 17/02; F21V 21/0965;
(Continued)

(56) References Cited

U.S. PATENT DOCUMENTS 2,080,859 A 5/1937 Otto et al.
4,447,802 A 5/1984 Bose
(Continued)

FOREIGN PATENT DOCUMENTS

CN 204387915 U 6/2015
CN 204759967 U 11/2015
(Continued)

OTHER PUBLICATIONS

Extended European Search Report for Application No. 25150239.9 dated Mar. 24, 2025 (15 pages).

*Primary Examiner* — Bao Q Truong
(74) *Attorney, Agent, or Firm* — Michael Best & Friedrich LLP

(57) ABSTRACT

A device may include a work light configured to emit light in a first direction. A device may include a hazard light configured to emit light in a second direction. A device may include a hinge coupled between the work light and the hazard light such that the work light and the hazard light are independently rotatable relative to each other about the hinge from a storage position to a deployed position. A device may include a user interface disposed on the hazard light, the user interface including a work light actuator engageable to actuate the work light and a hazard light actuator engageable independent from the work light actuator to actuate the hazard light.

16 Claims, 11 Drawing Sheets

(51) Int. Cl.

| | |
|---|---|
| ***F21V 17/02*** | (2006.01) |
| ***F21V 21/096*** | (2006.01) |
| ***F21V 21/40*** | (2006.01) |
| ***F21V 23/00*** | (2015.01) |
| ***H05B 45/10*** | (2020.01) |
| ***H05B 47/17*** | (2020.01) |
| *F21Y 107/50* | (2016.01) |
| *F21Y 115/10* | (2016.01) |

(52) U.S. Cl.
CPC ........ *F21V 21/0965* (2013.01); *F21V 21/406* (2013.01); *F21V 23/006* (2013.01); *H05B 45/10* (2020.01); *H05B 47/17* (2020.01); *F21Y 2107/50* (2016.08); *F21Y 2115/10* (2016.08)

(58) Field of Classification Search
CPC .. F21V 21/406; F21V 23/006; F21Y 2115/10; F21Y 2107/50
See application file for complete search history.

(56) References Cited

U.S. PATENT DOCUMENTS

| | | | | |
|---|---|---|---|---|
| 5,221,003 | A | 6/1993 | Chang | |
| 6,265,969 | B1 | 7/2001 | Shih | |
| 6,839,001 | B1 | 1/2005 | Bonin | |
| 6,899,441 | B2 | 5/2005 | Chen | |
| 6,928,951 | B2 | 8/2005 | Huang | |
| 7,011,423 | B2 | 3/2006 | Chen | |
| 7,437,845 | B2 | 10/2008 | Huang | |
| 8,303,142 | B2 * | 11/2012 | Bryant | F21V 21/0925 362/184 |
| 8,336,480 | B2 | 12/2012 | Li | |
| 8,365,918 | B1 | 2/2013 | Andino | |
| 8,721,120 | B2 * | 5/2014 | Christ | F21V 14/025 362/183 |
| 8,742,917 | B2 | 6/2014 | Ho | |
| 9,046,231 | B2 * | 6/2015 | Christ | F21V 23/0414 |
| 9,235,210 | B2 | 1/2016 | Zhang | |
| 9,302,617 | B2 | 4/2016 | Simmons | |
| 9,545,878 | B2 | 1/2017 | Simmons | |
| 9,566,907 | B2 | 2/2017 | Simmons | |
| 9,718,401 | B2 | 8/2017 | Kim | |
| 9,862,314 | B2 | 1/2018 | Xia | |
| 10,072,829 | B1 | 9/2018 | Christ et al. | |
| 10,787,120 | B2 | 9/2020 | Wornham | |
| 10,994,652 | B2 | 5/2021 | Kim | |
| 11,097,655 | B2 | 8/2021 | Wornham | |
| 2004/0237877 | A1 | 12/2004 | Huang | |
| 2005/0237173 | A1 | 10/2005 | Huang | |
| 2018/0154828 | A1 | 6/2018 | Wornham | |
| 2019/0353332 | A1 | 11/2019 | You | |

FOREIGN PATENT DOCUMENTS

| | | | |
|---|---|---|---|
| DE | 202005009815 | U1 | 10/2005 |
| DE | 202016007685 | U1 | 3/2018 |
| GB | 2341408 | A | 3/2000 |
| GB | 2415728 | A | 1/2006 |
| JP | 2007311055 | A | 11/2007 |
| KR | 101159295 | B1 | 6/2012 |
| WO | 2010131172 | A2 | 11/2010 |
| WO | 2012150754 | A2 | 11/2012 |
| WO | 2016005281 | A1 | 1/2016 |
| WO | 2017035888 | A1 | 3/2017 |
| WO | 2020078152 | A1 | 4/2020 |

* cited by examiner

HAZARD LIGHT

CROSS-REFERENCE TO RELATED APPLICATIONS

This application claims priority to U.S. Provisional Patent Application No. 63/617,108, filed on Jan. 3, 2024, the entire content of which is hereby incorporated by reference.

FIELD OF THE DISCLOSURE

The present disclosure relates to light units, and more specifically, to light units for indicating a roadside hazard.

SUMMARY

In some aspects, the techniques described herein relate to a light unit including: a work light configured to emit light in a first direction; a hazard light configured to emit light in a second direction; a hinge coupled between the work light and the hazard light such that the work light and the hazard light are independently rotatable relative to each other about the hinge from a storage position to a deployed position; a user interface disposed on the hazard light, the user interface including a work light actuator engageable to actuate the work light and a hazard light actuator engageable independent from the work light actuator to actuate the hazard light.

In some aspects, the techniques described herein relate to a light unit, wherein the hazard light is rotatable approximately 200 degrees relative to the work light from the storage position.

In some aspects, the techniques described herein relate to a light unit, wherein the storage position is defined by the work light and the hazard light in a back-to-back arrangement.

In some aspects, the techniques described herein relate to a light unit, wherein the hinge defines a cavity configured to receive a battery configured to provide power to each of the work light and to the hazard light.

In some aspects, the techniques described herein relate to a light unit, wherein the work light actuator includes at least two work light modes, and wherein the hazard light actuator includes at least two hazard light modes separate from the work light modes.

In some aspects, the techniques described herein relate to a light unit, wherein the at least two work light modes include two or more of a low intensity mode, a medium intensity mode, and a high intensity mode.

In some aspects, the techniques described herein relate to a light unit, wherein the at least two hazard light modes include two or more of a steady mode, a flash mode, and a tracer mode.

In some aspects, the techniques described herein relate to a light unit, wherein the work light includes a first frame and the hazard light includes a second frame different from the first frame, and wherein at least one of the first frame and the second frame includes a magnet.

In some aspects, the techniques described herein relate to a light unit, wherein only the work light includes an aperture configured to be gripped by a user.

In some aspects, the techniques described herein relate to a light unit, wherein the hazard light further includes a circuit board electrically coupled to the work light and the hazard light, wherein the circuit board is configured to control an output of each of the work light and the hazard light.

In some aspects, the techniques described herein relate to a light unit, wherein the circuit board further includes a user interface including a work light actuator and a hazard light actuator disposed only on the work light or the hazard light.

In some aspects, the techniques described herein relate to a light unit, wherein the circuit board is a first circuit board and the light unit further includes a second circuit board electrically coupled between first circuit board and the work light and a third circuit board electrically coupled between the first circuit board and the hazard light.

In some aspects, the techniques described herein relate to a light unit including: a work light including a first hinge portion through which a pivot axis extends; and a hazard light including a second hinge portion rotatably coupled to the first hinge portion about the pivot axis; wherein the first hinge portion and the second hinge portion cooperatively define a cavity configured to receive a power source to power each of the work light and the hazard light.

In some aspects, the techniques described herein relate to a light unit, wherein each of the work light and hazard light is pivotable about the pivot axis up to approximately 200 degrees from a storage position in which the work light and the hazard light are in a back-to-back arrangement.

In some aspects, the techniques described herein relate to a light unit, further including a first circuit board electrically coupled to the work light and a second circuit board coupled to the hazard light.

In some aspects, the techniques described herein relate to a light unit, wherein the first circuit board includes a user interface including a work light actuator and a hazard light actuator disposed only on the work light or the hazard light.

In some aspects, the techniques described herein relate to a light unit, further including a second circuit board electrically coupled between the first circuit board and the work light and a third circuit board electrically coupled between the first circuit board and the hazard light.

In some aspects, the techniques described herein relate to a light unit including: a work light fixture including: a work light frame defining a plurality of frame segments and at least one aperture formed between the frame segments; a first LED disposed at a center portion of the frame segments; and a first hinge portion coupled to at least one of the plurality of frame segments; and a hazard light fixture including: a hazard light frame having a second hinge portion pivotably coupled to the first hinge portion, the hazard light frame further having a first portion defining an outer periphery of the hazard light frame and a second portion spaced from the first portion toward a center of the hazard light frame; a channel defined between the first portion and the second portion; a second LED disposed within the channel; and a circuit board supported by the second portion, the circuit board configured to control an output of each of the first LED and the second LED; wherein the first hinge portion and the second hinge portion cooperatively define a cylindrical body configured to receive a power source.

In some aspects, the techniques described herein relate to a light unit, wherein the circuit board includes a user interface having a work light actuator and a hazard light actuator that are independently actuatable to control the work light and the hazard light.

In some aspects, the techniques described herein relate to a light unit, wherein the work light actuator is configured to switch the work light between at least two different work light modes, and wherein the hazard light actuator is configured to switch the hazard light between at least two different hazard light modes.

DETAILED DESCRIPTION

Figure 1:
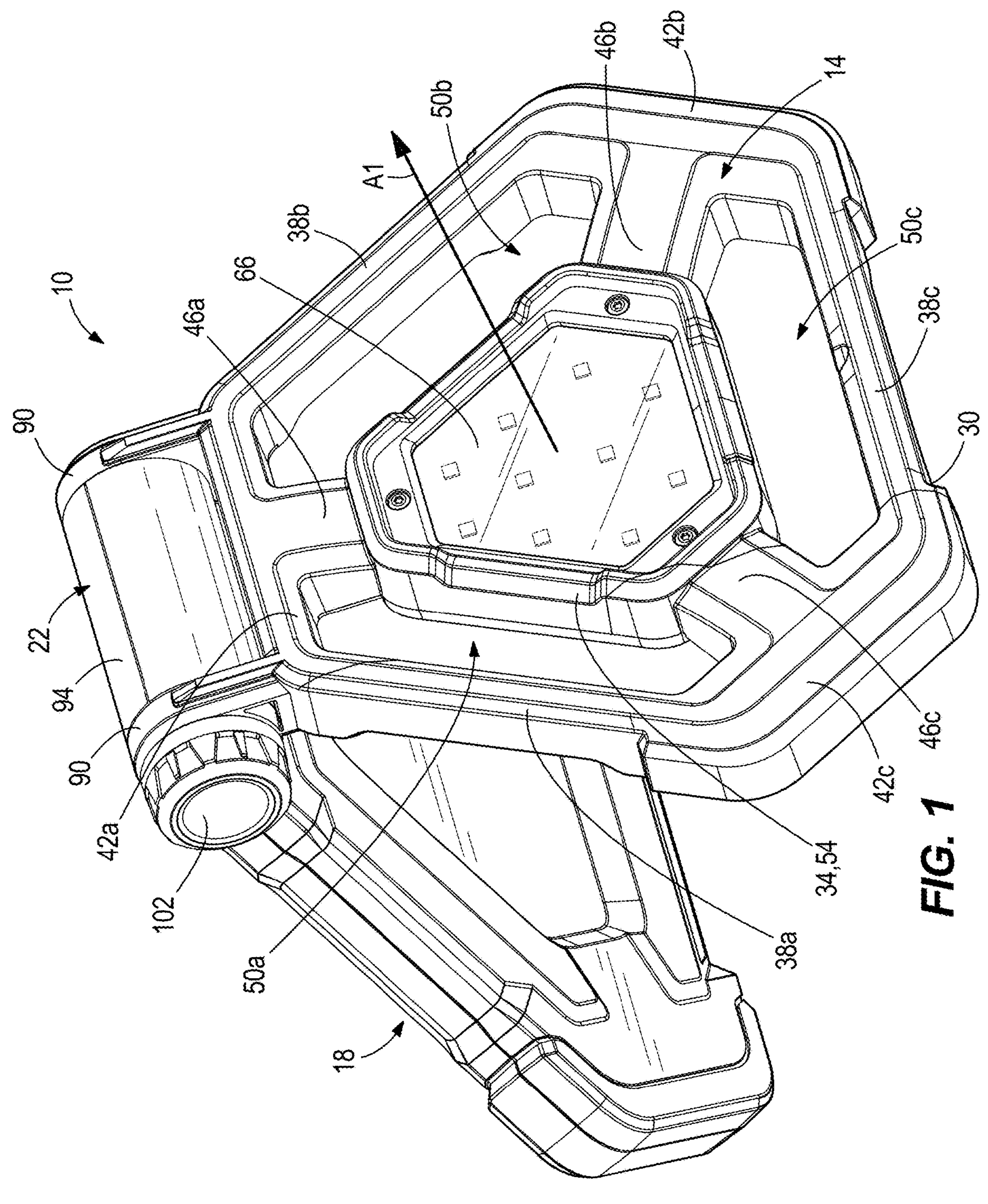
FIG. 1 is a front perspective view of a light unit including a work light and illustrated in a deployed position according to an example of the disclosure.

Before any examples of the disclosure are explained in detail, it is to be understood that the disclosure is not limited in its application to the details of construction and the arrangement of components set forth in the following description or illustrated in the following drawings. The disclosure is capable of other examples and of being practiced or of being carried out in various ways. Also, it is to be understood that the phraseology and terminology used herein is for the purpose of description and should not be regarded as limiting.

The detailed description uses numerical and letter designations to refer to features in the drawings. Like or similar designations in the drawings and description have been used to refer to like or similar parts of the disclosure.

The singular forms "a," "an," and "the" include plural references unless the context clearly dictates otherwise. The terms "coupled," "fixed," and the like refer to both direct coupling or fixing, as well as indirect coupling or fixing through one or more intermediate components or features, unless otherwise specified herein. As used herein, the terms "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive- or. For example, a condition A or B is satisfied by any one of the following: A is true (or present) and B is false (or not present), A is false (or not present) and B is true (or present), and both A and B are true (or present).

Benefits, other advantages, and solutions to problems are described below with regard to specific examples. However, the benefits, advantages, solutions to problems, and any feature(s) that may cause any benefit, advantage, or solution to occur or become more pronounced are not to be construed as a critical, required, or essential feature of any or all the claims.

Figure 2:
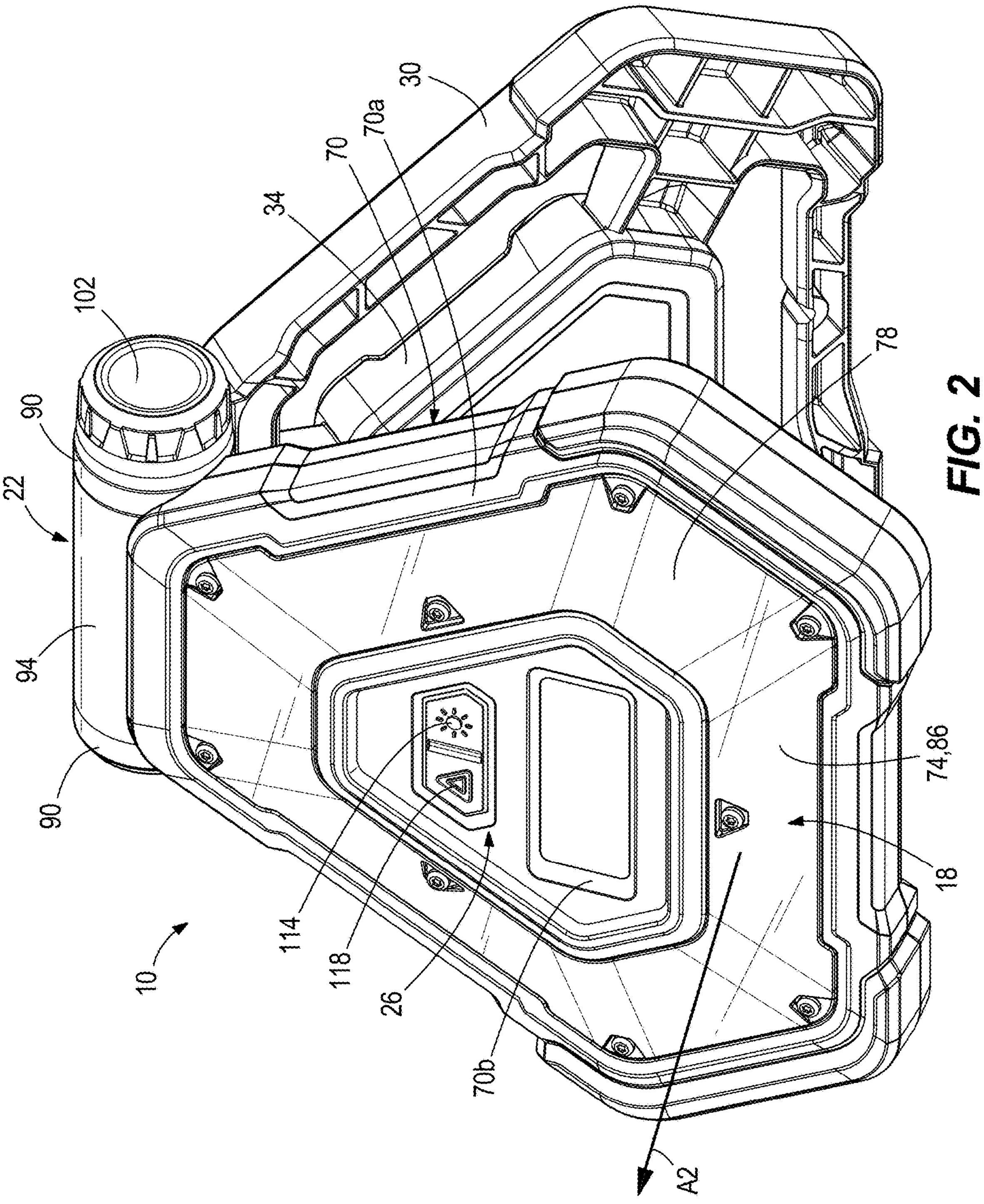
FIG. 2 is a rear perspective view of the light unit of FIG. 1 including a hazard light and illustrated in a deployed position.
Figure 8:
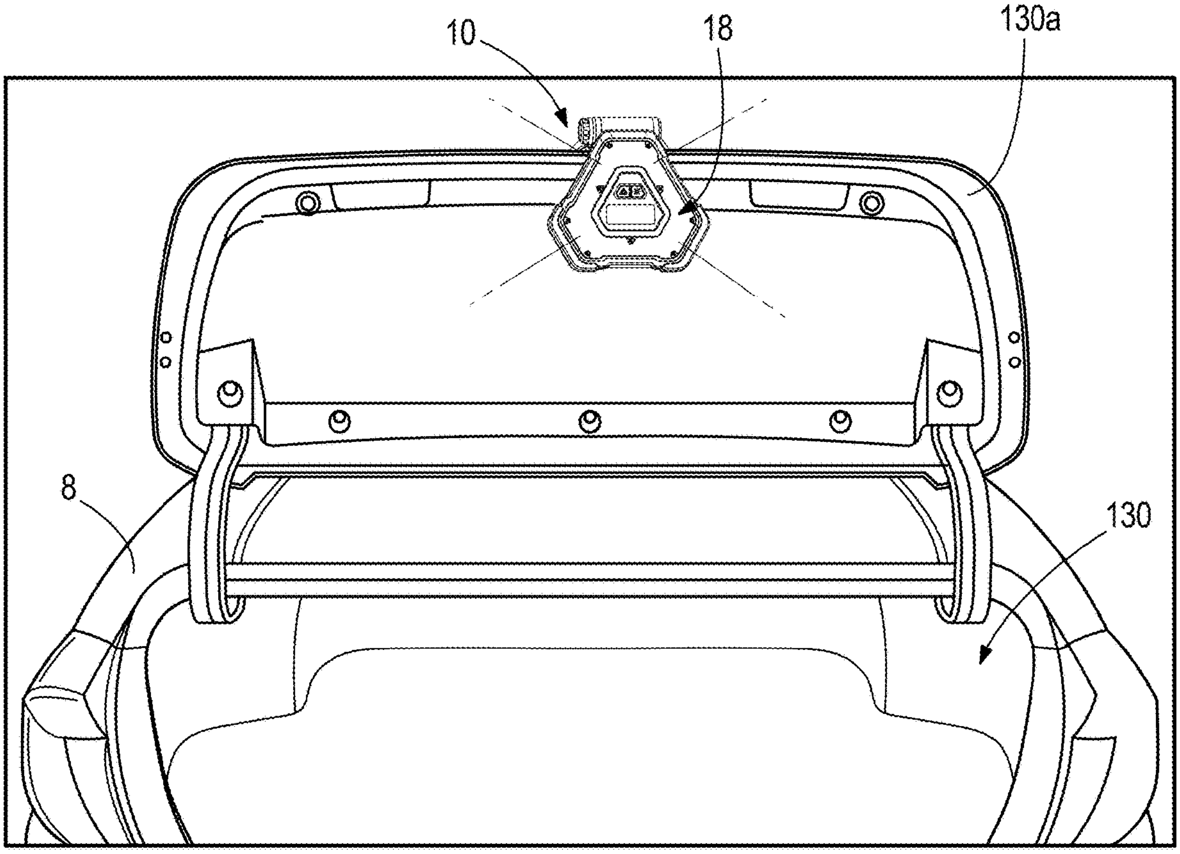
FIG. 8 is a perspective view of the light unit used in another exemplary application.

FIGS. 1 and 2 illustrate a light unit 10 including a work light 14, a hazard light 18, a hinge 22 that pivotably couples the work light 14 and the hazard light 18 together, and a user interface 26 that controls operation of the work light 14 and the hazard light 18. With reference to FIG. 8, the light unit 10 may be used, for example, alongside a vehicle 8 (e.g., adjacent or on a roadside or in a parking structure) to illuminate in a direction of the vehicle 8 as well as to illuminate in another direction (e.g., the opposite direction) and to indicate a hazard for the stopped vehicle 8.

Figure 3:
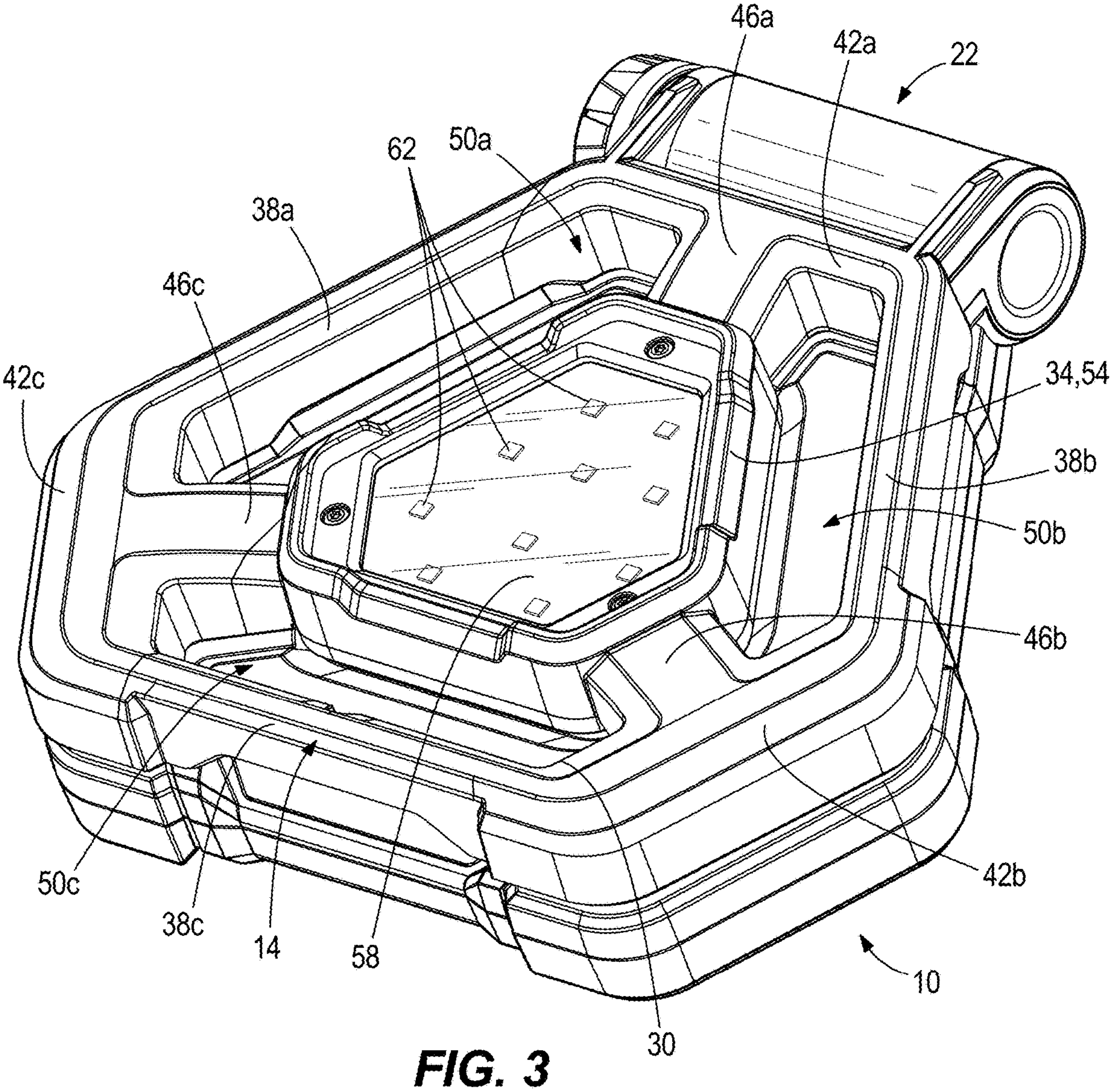
FIG. 3 is a perspective view of the work light with the light unit in a collapsed position.

As illustrated in FIGS. 1 and 3, the work light 14 includes a work light housing, or frame 30, and a work light fixture 34 supported by the work light frame 30. The illustrated work light frame 30 is polygonally-shaped and has an overall triangular profile with a first plurality of frame segments 38*a*, 38*b*, 38*c* and a second plurality of frame segments 42*a*, 42*b*, 42*c*. Each of the first frame segments 38*a*, 38*b*, 38*c* defines a leg of the triangularly shaped work light frame 30. The second frame segments 42*a*, 42*b*, 42*c* extend between respective adjacent first frame segments 38*a*, 38*b*, 38*c*. The work light fixture 34 is positioned between (e.g., in the center of) the frame segments 38*a*-38*c*, 42*a*-42*c* and is supported by a plurality of support segments 46*a*, 46*b*, 46*c*. Each of the support segments 46*a*-46*c* extends from a corresponding one of the second frame segments 42*a*, 42*b*, 42*c* to the work light fixture 34 to support the work light fixture 34. The work light frame 30 defines a plurality of apertures 50*a*, 50*b*, 50*c*. Specifically, the work light frame 30 defines three apertures 50*a*, 50*b*, 50*c*. Each of the apertures 50*a*, 50*b*, 50*c* is defined between the work light fixture 34, one of the first frame segments 38*a*, 38*b*, 38*c*, and two of the support segments 46*a*, 46*b*, 46*c*. The apertures 50*a*, 50*b*, 50*c* may allow a user to grasp the light unit 10 by one of the first frame segments 38*a*, 38*b*, 38*c* for carrying the light unit 10. In the illustrated example, a portion of the first frame segment 38*c* positioned opposite from the hinge 22 is cutout such that the first frame segment 38*c* positioned opposite from the hinge 22 may operate as a handle or grip for carrying the light unit 10. The apertures 50*a*, 50*b*, 50*c* may additionally allow a user to hang the light unit 10 from a height relative to a workspace, as will be described in more detail.

In the illustrated example, the work light frame 30 is formed of a high-strength polymer material. In the illustrated example, the polymer material is formed of a combination of polycarbonate (PC) polymers and acrylonitrile butadiene styrene (ABS) polymers. In other examples, the polymer material may additionally or alternatively include a polyamideimide (PAI) polymer, a polyether ether ketone (PEEK) polymer, a high-density polyethylene (HDPE) polymer, or another similar polymer. In some examples, the work light frame 30 may be formed of a combination of materials including multiple polymers and other materials, such as metals. The work light frame 30 is also formed with an internal structural design that strengthens the work light frame 30. Specifically, the internal structural design includes forming the work light frame 30 with relatively thicker outer walls and thicker internal ribs than a typical polymer frame. As such, the material and the internal structural design of the work light frame 30 advantageously provide the work light 14 with a drop resistance of up to at least six feet and a crush resistance of at least 10,000 lbs. That is, the material and the internal structural design of the work light frame 30 may inhibit breakages and failure from unintentional drops and unintentional crushing from, for example, drops of the light unit 10 in which the light unit 10 falls up to six feet and/or crushing from a vehicle driving over the work light 14. Additionally, the work light frame 30 may be manufactured according to a system-level Ingress Protection Code (i.e. IP Code) such that the work light frame 30 has an IP Code of 55 (i.e. a solid IP Code of 5 and a liquid IP code of 5). At a solid IP Code of 5, the work light frame 30 inhibits dust ingress from interfering with the internal electrics of the work light 14. At a liquid IP Code of 5, the work light frame 30 is protected against low pressure jets of water applied to the work light 14.

The work light fixture 34 includes a work light printed circuit board (PCB) 58, a first plurality of light emitting diodes (LEDs) 62, and a first lens 66 positioned downstream of the first LEDs 62 along a first light emitting direction A1. The work light fixture 34 has an outer periphery that is roughly identical, but scaled down in size, to an outer periphery of the work light frame 30 such that the work light fixture 34 fits between the frame segments 38*a*-38*c*, 42*a*-42*c*. Each of the work light PCB 58, the first LEDs 62, and the first lens 66 is supported within the outer periphery of the work light fixture 34. The first LEDs 62 are positioned on the work light PCB 58. The first LEDs 62 are configured to receive electricity from the work light PCB 58 and emit white light through the first lens 66 along the first light emitting direction A1 when the work light 14 is turned on. The first light emitting direction A1 extends perpendicularly to the first lens 66. The first LEDs 62 are arranged on the work light PCB 58 such that the first LEDs 62 are configured to emit light in 360 degrees around the periphery of the work light 14 along the first light emitting direction A1. In the illustrated example, the first LEDs 62 are configured to emit 500 lumens of light output. In some examples, the first LEDs 62 may be configured to emit more lumens of light output. Additionally, the first LEDs 62 are configured to emit light that is visible for up to at least one mile away from the work light 14.

Figure 4:
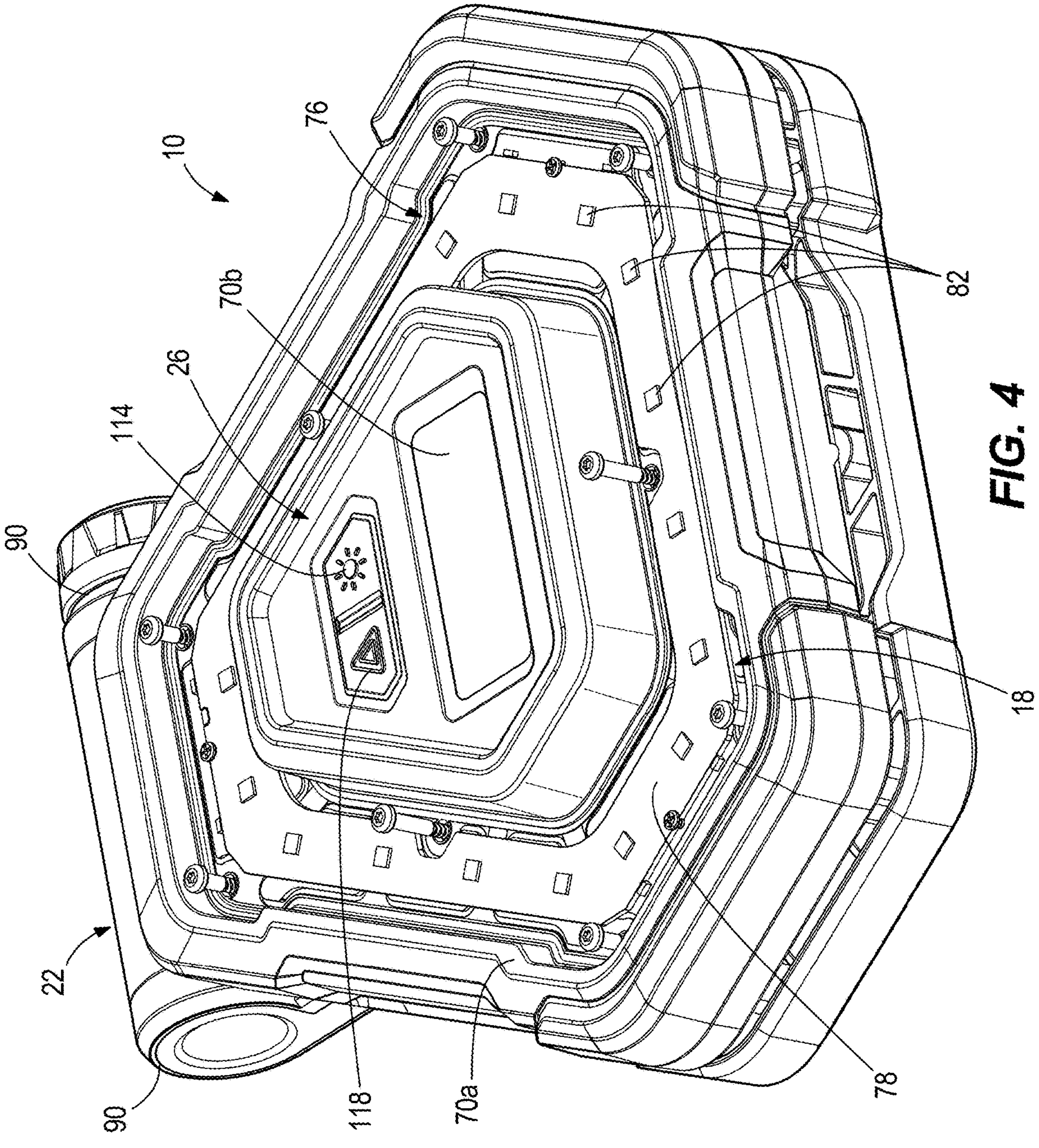
FIG. 4 is a perspective view of the hazard light with the light unit in the collapsed position.

As illustrated in FIGS. 2 and 4, the hazard light 18 includes a hazard light housing, or frame 70, and a hazard light fixture 74. The illustrated hazard light frame 70 is polygonally-shaped and has an overall triangular profile with a first portion 70*a* and a second portion 70*b*. In the illustrated example, the first portion 70*a* and the second portion 70*b* are formed together. For example, the first portion 70*a* and the second 70*b* may be formed with a manufacturing process such as injection molding. In some example, the first portion 70*a* and the second portion 70*b* may be formed separately and secured to one another. The first portion 70*a* has an outer periphery that is roughly identical to an outer periphery of the work light frame 30. The second portion 70*b* is positioned at the center of the first portion 70*a* and is shaped substantially similarly to the work light fixture 34. As such, the second portion 70*b* has an outer periphery that is roughly identical, but scaled down in size, to the outer periphery of the first portion 70*a* such that the second portion 70*b* fits within the outer periphery of the first portion 70*a*. The first portion 70*a* and the second portion 70*b* define a channel 76 that is polygonally-shaped and has an overall triangular profile between the first portion 70*a* and the second portion 70*b*. In the illustrated example, the hazard light frame 70 is formed of the same material and the same internal structural design as the work light frame 30. As such, the hazard light frame 70 advantageously provides the hazard light 18 with drop resistance of up to six feet and crush resistance of at least 10,000 lbs. Additionally, the hazard light 18 may be manufactured according system-level IP Code with an IP rating of 55 (i.e. a solid IP Code of 5 and a liquid IP Code of 5).

The hazard light fixture 74 is installed within the channel 76 defined between the first portion 70*a* and the second portion 70*b* of the hazard light frame 70. The hazard light fixture 74 includes a hazard light PCB 78, a second plurality of LEDs 82, and a second lens 86 positioned downstream of the second LEDs 82 along a second light emitting direction A2. The hazard light PCB 78 is triangularly shaped. In the illustrated example, the second portion 70*b* of the hazard light frame 70 extends through the center of the hazard light PCB 78 such that the hazard light PCB 78 is positioned within the channel 76 between the first portion 70*a* and the second portion 70*b* of the hazard light frame 70. The second LEDs 82 are positioned on the hazard light PCB 78. The second LEDs 82 are configured to receive electricity from the hazard light PCB 78 and emit red light through the second lens 86 along the second light emitting direction A2 when the hazard light 18 is turned on. The second light emitting direction A2 extends perpendicularly to the second lens 86. The second LEDs 82 are arranged on the hazard light PCB 78 such that the second LEDs 82 are configured to emit light in 360 degrees around the periphery of the hazard light 18 along the second light emitting direction A2. Additionally, the second LEDs 82 are configured to emit light that is visible for up to at least one mile from the hazard light 18.

The light unit 10 may additionally include magnets in one or both of the work light 14 and the hazard light 18. Specifically, the magnets may be supported within one or both of the work light frame 30 and the hazard light frame 70. The magnets may assist with mounting the light unit 10 to a surface. For example, the magnets in the light unit 10 may be placed in magnetic engagement with a metal surface to secure the light unit 10 to the metal surface.

Figure 5A:
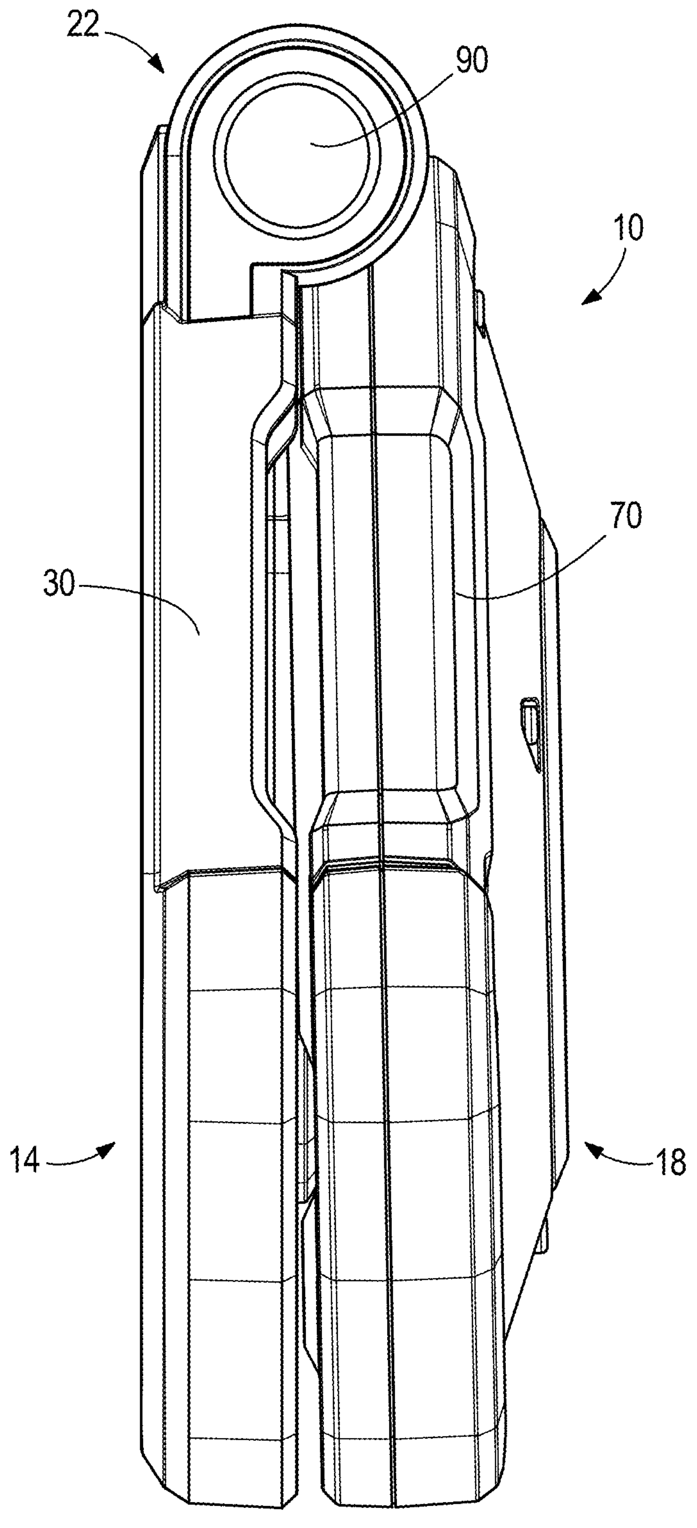
FIG. 5A is a side view of the light unit in the collapsed position.
Figure 5B:
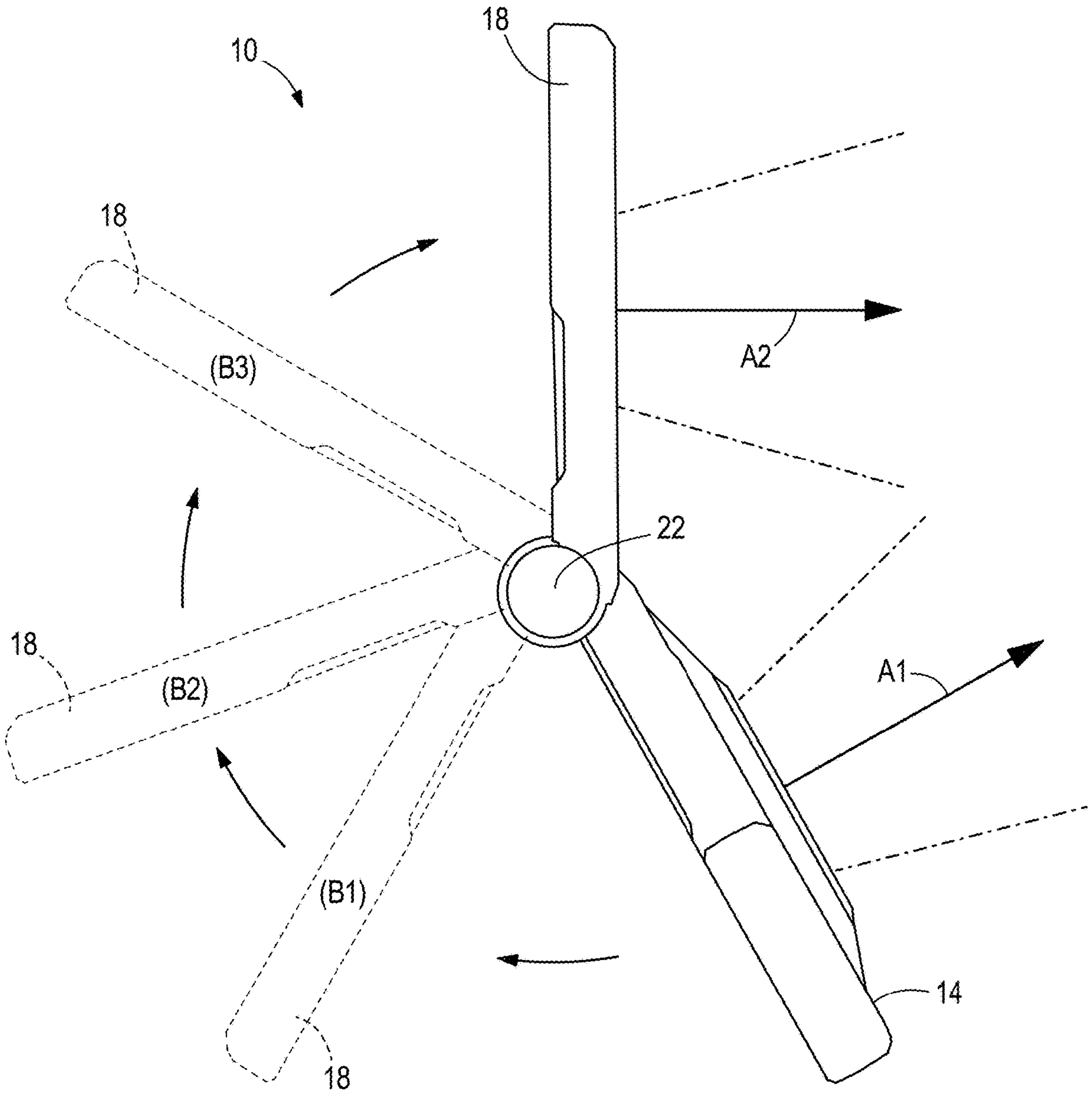
FIG. 5B is a schematic view of the light unit illustrating a plurality of deployed positions.

With reference to FIGS. 1 and 2, the hinge 22 includes a work light hinge portion 90 and a hazard light hinge portion 94. The work light hinge portion 90 and the hazard light hinge portion 94 cooperatively define a cylindrical body. The work light hinge portion 90 extends from the work light frame 30 and provides the forward and rearward end of the cylindrical body. The hazard light hinge portion 94 extends from the hazard light frame 70 and extends between the forward and rearward end of the cylindrical body provided by the work light hinge portion 90. The hinge 22 enables the work light 14 and the hazard light 18 to pivot relative to one another. Specifically, as illustrated in FIGS. 5A and 5B, the hinge 22 allows the work light 14 and the hazard light 18 to pivot to adjust the light unit 10 between a collapsed or storage position (as illustrated in FIG. 5A) and a plurality of deployed positions (e.g., as illustrated in FIG. 5B). In the storage position, the work light 14 and the hazard light 18 are in a back-to-back arrangement where each of the outer profiles of the work light 14 and the hazard light 18 are substantially aligned.

For the sake of brevity, the plurality of deployed positions of the light unit 10 is described with respect to positions in which the hazard light 18 is pivoted relative to the work light 14. It is understood that the plurality of deployed positions also includes positions in which the work light 14 is pivoted relative to the hazard light 18. As illustrated in FIG. 5B, the light unit 10 is in a full-pivot position. In the full-pivot position, the hazard light 18 is pivoted 200 degrees relative to the work light 14. As such, the first light emitting direction A1 and the second light emitting direction A2 may intersect when the light unit 10 is in the full pivot position. In some examples, the hinge 22 may allow for additional pivoting such that the hazard light 18 is pivotable by more than 200 degrees relative to the work light 14. The hazard light 18 is infinitely adjustable between the collapsed position (FIG. 5A) and the full-pivot position such that the light unit 10 may be adjusted to a plurality of intermediate positions. FIG. 5B illustrates three exemplary intermediate positions B1, B2, B3. In a first intermediate position B1, the hazard light 18 is pivoted less than 90 degrees relative to the work light 14. More specifically, the hazard light 18 is pivoted roughly 70 degrees relative to the work light 14. In a second intermediate position B2, the hazard light 18 is pivoted roughly 90 degrees relative to the work light 14. In a third intermediate position B3, the hazard light 18 is pivoted between 90 degrees and 200 degrees relative to the work light 14. As such, the light unit 10 may be positioned according to user preference in any deployed position in which the angle between the work light 14 and the hazard light 18 is between 0 and 200 degrees.

Figure 6:
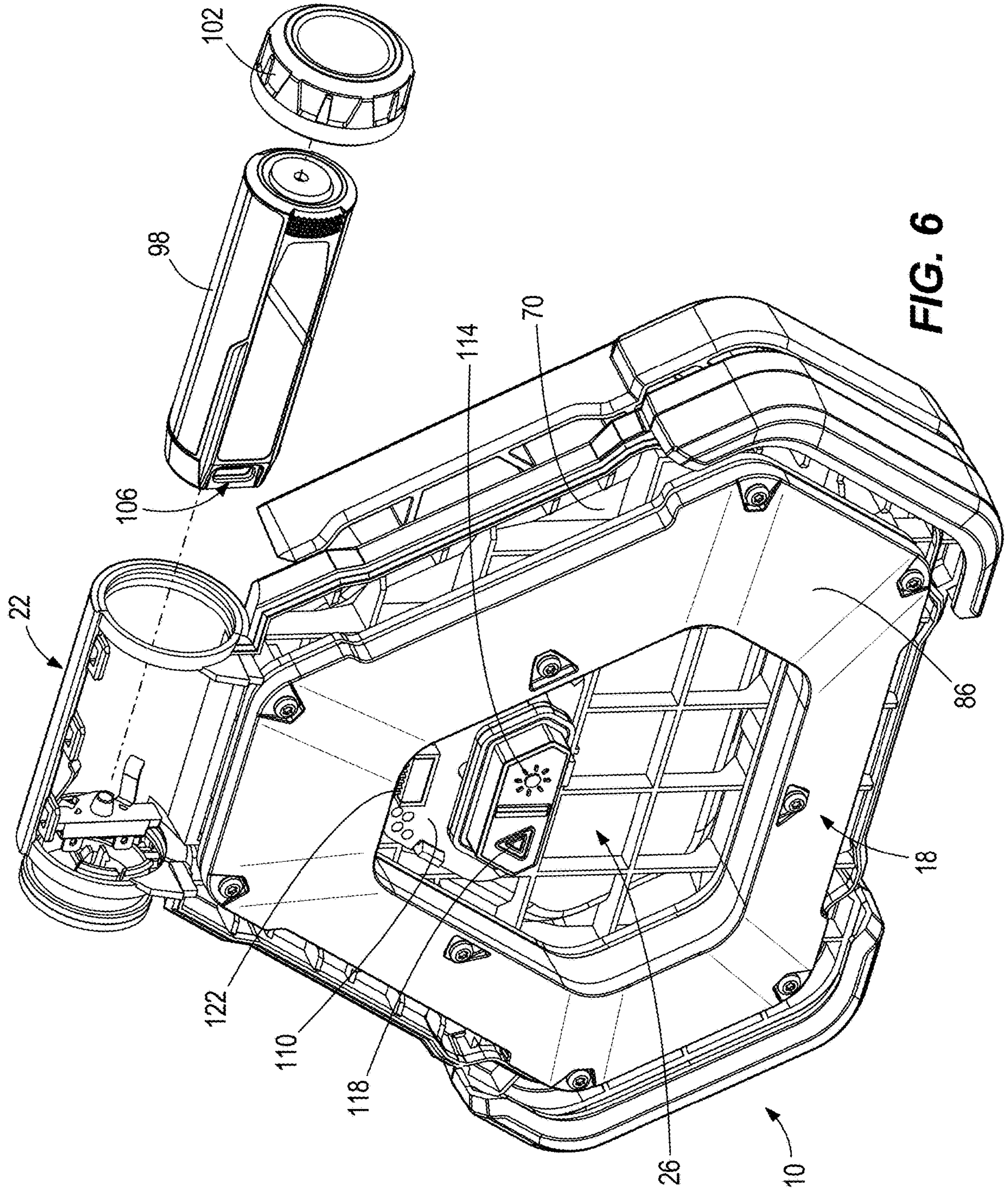
FIG. 6 is a partial exploded view of a portion of the light unit and a battery for the light unit.

With reference to FIG. 6, the cylindrical body of the hinge 22 defines a cavity shaped to receive a battery 98 that provides power to the work light PCB 58 for illumination of the first LEDs 62 (FIG. 3) and to the hazard light PCB 78 for illumination of the second LEDs 82 (FIG. 4). The hinge 22 further includes a cap 102 that is threadedly coupled to the cylindrical body. The cap 102 may be selectively removed from the body to allow access to the cavity for insertion and removal of the battery 98. The battery 98 may include lithium ion (Li-ion) cells. In alternate examples, the battery 98 may be of a different chemistry (e.g., nickel-cadmium (NiCa or NiCad), nickel-hydride, and the like). The battery 98 has a 24-hour life such that the light unit 10 may be powered for 24 continuous hours solely by the battery 98. In the illustrated example, the battery 98 is a 4-volt battery. In alternate examples, the capacity of the battery 98 may vary. The battery 98 may include a charging port that allows the battery 98 to be recharged by an external power source when the battery 98 is removed from the cavity of the cylindrical body. In some examples, the battery 98 may be rechargeable while the battery 98 is positioned within the body. The battery 98 additionally includes a USB port 106 that may function as a power outlet to allow the battery 98 to be used as a portable power source separately from the light unit 10. For example, a USB cord may be plugged into the USB port 106 of the battery 98 to charge a mobile phone.

As illustrated in FIGS. 4 and 6, the user interface 26 is supported on and in the second portion 70*b* of the hazard light frame 70 and includes a user interface PCB 110, a work light actuator 114, and a hazard light actuator 118. The user interface PCB 110 is substantially enclosed by the second portion 70*b* of the hazard light frame 70 and is electrically connected to the work light PCB 58 (FIG. 3), the hazard light PCB 78, and the battery 98 via wiring 122. Each of the work light actuator 114 and the hazard light actuator 118 is positioned on the user interface PCB 110 and extends through the second portion 70*b* of the hazard light frame 70. The work light actuator 114 is actuatable to turn on and adjust a work light mode of the work light 14. The hazard light actuator 118 is actuatable to turn on and adjust a hazard light mode of the hazard light 18. In the illustrated example, the work light actuator 114 and the hazard light actuator 118 are independent of each other such that actuation of the work light actuator 114 or the hazard light actuator 118 does not affect actuation of the other of the work light actuator 114 or the hazard light actuator 118. As such, the work light 14 and the hazard light 18 may be illuminated independent of one another. The work light actuator 114 and the hazard light actuator 118 may be actuated at the same time such that the work light 14 and the hazard light 18 are illuminated at the same time.

In the illustrated example, the work light 14 has at least three different work light modes, and the hazard light 18 has at least three different hazard light modes. The at least three work light modes include a low intensity mode, a medium intensity mode, and a high intensity mode. A user may switch between the work light modes by pressing, or actuating, the work light actuator 114. Specifically, actuation (e.g., pressing the actuator 114 toward the user interface PCB 110) of the work light actuator 114 when the work light 14 is off switches the work light 14 to the low intensity mode. Actuation the work light actuator 114 again (i.e., a second time) switches the work light 14 from the low intensity mode to the medium intensity mode. Actuation of the work light actuator 114 once more (i.e., a third time) switches the work light 14 from the medium intensity mode to the high intensity mode. When the work light 14 is in the high intensity mode, actuation of the work light actuator 114 (i.e., a fourth time) turns the work light 14 off.

In the illustrated example, the three hazard light modes include a steady mode, a flash mode, and a tracer mode. In the steady mode, light emitted from the hazard light 18 is constant. In the flash mode, light emitted from the hazard light 18 intermittently flashes (e.g., in a pattern). In the tracer mode, light emitted from the hazard light 18 loops around the second portion 70*b* of the hazard light frame 70. That is, each of the second LEDs (FIG. 4) are illuminated in succession or sequentially (and thereafter turned off) along a clockwise or counterclockwise path such that the emitted light appears to move along a path. A user may switch the hazard light 18 between the hazard light modes by pressing, or actuating, the hazard light actuator 118 as similarly described with respect to the work light actuator 114. Specifically, actuation (e.g., pressing the actuator 118 toward the user interface PCB 110) of the hazard light actuator 118 when the hazard light 18 is off switches the hazard light 18 to the steady mode. Actuation of the hazard light actuator 118 again (i.e., a second time) switches the hazard light 18 from the steady mode to the flash mode. Actuation of the hazard light actuator 118 once more (i.e., a third time) switches the hazard light 18 from the flash mode to the tracer mode. When the hazard light 18 is in the tracer mode, actuation of the hazard light actuator 118 (i.e., a fourth time) turns the hazard light 18 off.

Due to the work light actuator 114 and the hazard light actuator 118 being independently operable, the light unit 10 may be set in 15 different modes. The 15 different modes include every combination of the following: the work light 14 turned off with the hazard light 18 in each of the three hazard light modes, the hazard light 18 turned off with the work light 14 in each of the three work light modes, the work light 14 in the low intensity mode with the hazard light 18 in each of the three hazard light modes, the work light 14 in the medium intensity mode with the hazard light 18 in each of the three hazard light modes, and the work light 14 in the high intensity mode with the hazard light 18 in each of the three hazard light modes. For example, in a first mode of the light unit 10, the work light 14 is turned off and the hazard light 18 is in the flash mode. In a second mode of the light unit 10, the work light 14 is in the high intensity mode, and the hazard light 18 is turned off. In a third mode, the work light 14 is in the high intensity mode, and the hazard light 18 is in the tracer mode. It can be appreciated that the first mode, the second mode, and the third mode are provided as examples and are not indicative of a primary mode or use of the light unit 10. In some examples, the light unit 10 may be operable in fewer than or more than 15 modes. For example, the work light 14 may include additional intensity modes. In one or more example, the work light 14 may include fewer intensity modes. In another example, the work light 14 may be operable in a flash mode in which the first LEDs 62 flash intermittently. In one or more example, the hazard light 18 may have additional modes (e.g., modes of different light intensities).

Figure 7:
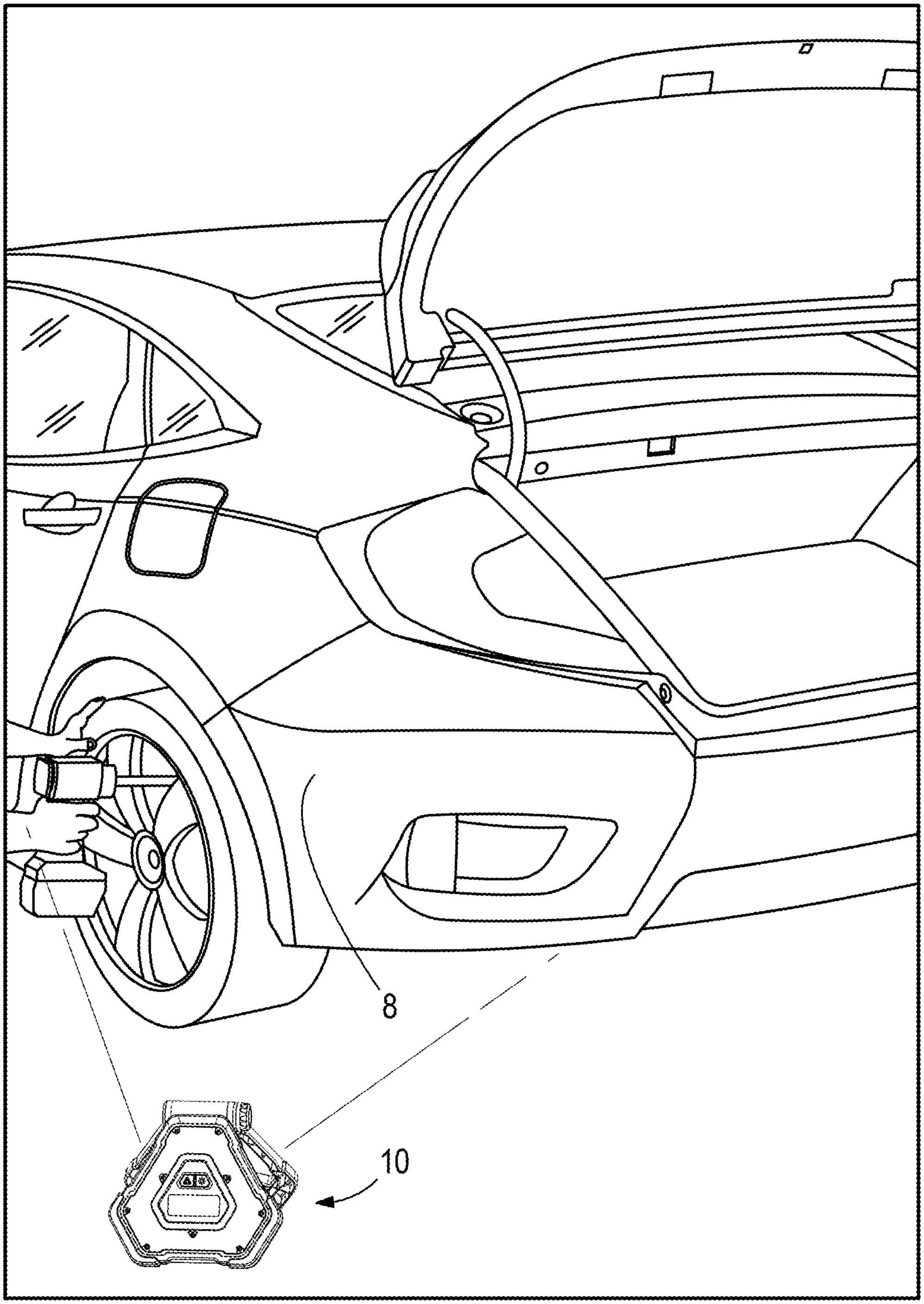
FIG. 7 is a perspective view of the light unit used in an exemplary application.

The light unit 10 may be used in multiple applications. In one application, with reference to FIG. 7, the light unit 10 may be utilized alongside a vehicle 8. Specifically, the light unit 10 may be utilized to assist (e.g., by providing illumination) with performing maintenance on a vehicle 8 on a roadside while indicating a hazard to drivers on the road passing by. In this application, with reference to FIGS. 5B and 7, the hazard light 18 may be pivoted about the hinge 22 to the first intermediate position B1. In the first intermediate position B1, the hazard light 18 is pivoted roughly 70 degrees about the hinge 22 relative to the work light 14 such that the work light 14 and the hazard light 18 may cooperatively support the light unit 10 relative to a ground surface to allow the light unit 10 to stand relative to the ground surface. Once the light unit 10 is placed on the ground surface, a user may set the light unit 10 in any of the 15 different modes through actuation of the work light actuator 114 and the hazard light actuator 118. For example, a user may set the light unit 10 in the third mode of the light unit 10, as described above, in which the work light 14 is in the high intensity mode to illuminate the vehicle 8, and the hazard light 18 is in the flash mode to provide a hazard indication to drivers on the road passing the vehicle 8.

In another application, as illustrated in FIG. 8, the light unit 10 may be used in association with a trunk 130 of the vehicle 8. For example, a trunk door 130*a* of the trunk 130 may be raised to allow access to the trunk 130. With the trunk door 130*a* raised, a user may mount the light unit 10 to the trunk door 130*a*. In this application, with reference to FIGS. 5B and 8, the hazard light 18 may be pivoted to the first intermediate position B1 in which the hazard light 18 is pivoted less than 90 degrees relative to the work light 14. With the light unit 10 in the first intermediate position B1, the light unit 10 may be mounted to the trunk door 130*a* such that the trunk door 130*a* extends between the work light 14 and the hazard light 18. As illustrated in FIG. 8, the light unit 10 is mounted such that the hazard light 18 faces rearward of the vehicle 8 (e.g., toward a user accessing the trunk 130) to indicate a hazard, for example, to drivers on a road passing by. The light unit 10 may also be mounted such that the work light 14 faces rearward of the vehicle 8 (e.g., toward a user accessing the trunk 130) to illuminate the trunk 130 and an area rearward of the vehicle 8. In examples of the light unit 10 in which the light unit 10 includes magnets, the magnets in the light unit 10 may engage an outer surface of the trunk door 130*a* to magnetically attach the light unit 10 to the trunk door 130*a*.

Figure 9:
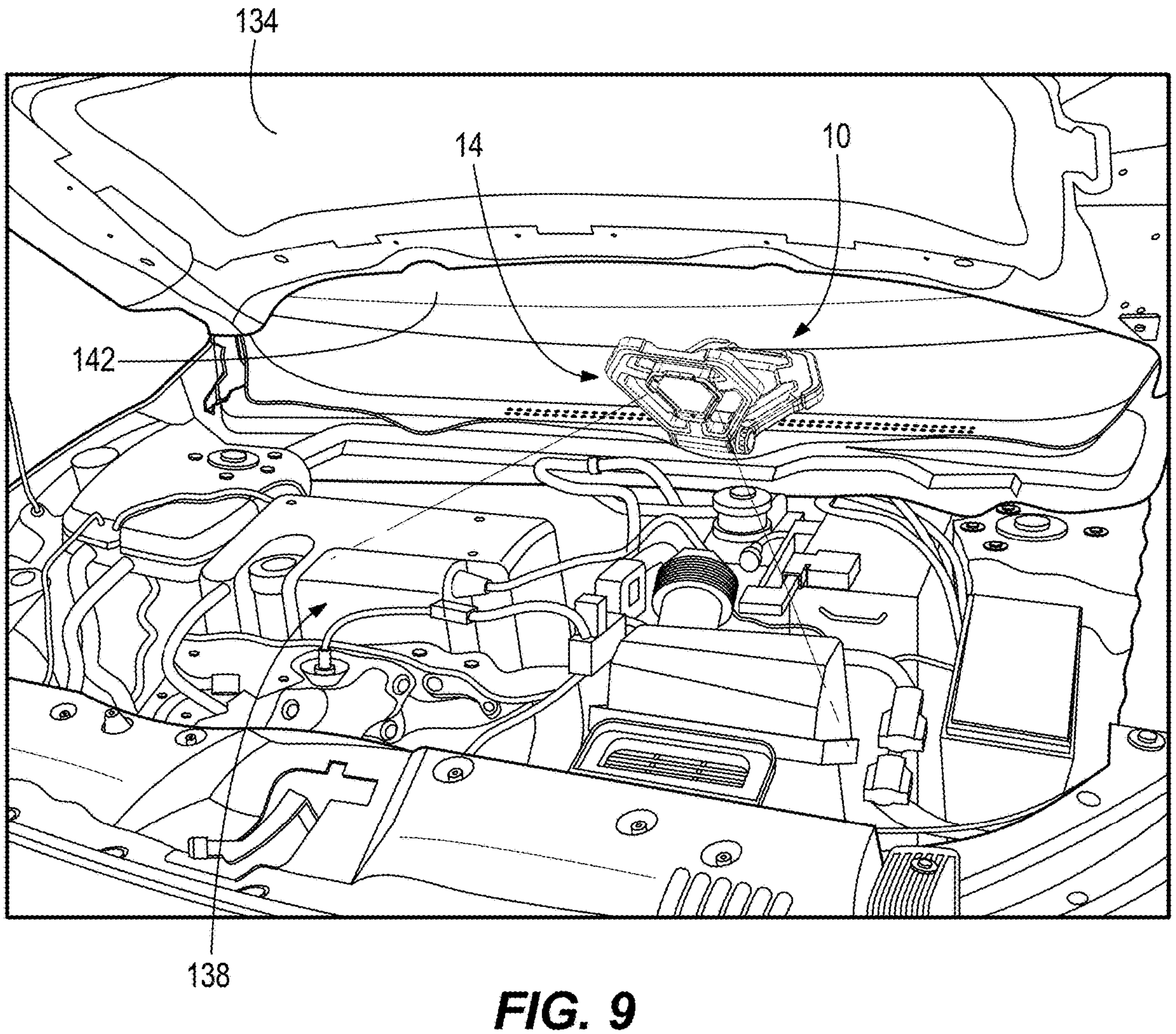
FIG. 9 is a perspective view of the light unit used in a further exemplary application.

In a further application, as illustrated in FIG. 9, the light unit 10 may be used in association with a hood 134 of the vehicle 8. For example, the hood 134 of the vehicle 8 may be raised to allow access to an engine 138 of the vehicle 8. With the hood 134 raised, a user may mount the light unit 10 to vehicle by placing the light unit 10 on, for example, a windshield 142 of the vehicle 8. In this application, with reference to FIGS. 5B and 9, the hazard light 18 may be pivoted to the second intermediate position B2 in which the hazard light 18 is pivoted roughly 90 degrees relative to the work light 14. The light unit 10 may then be placed on the windshield 142 of the vehicle 8 such that the work light 14 is oriented to emit light directly onto a desired portion of the engine 138 of the vehicle 8. In some instances, the hazard light 18 may be pivoted more or less than 90 degrees to allow a user to set the light unit 10 such that light is emitted as desired relative to the engine 138.

Figure 10:
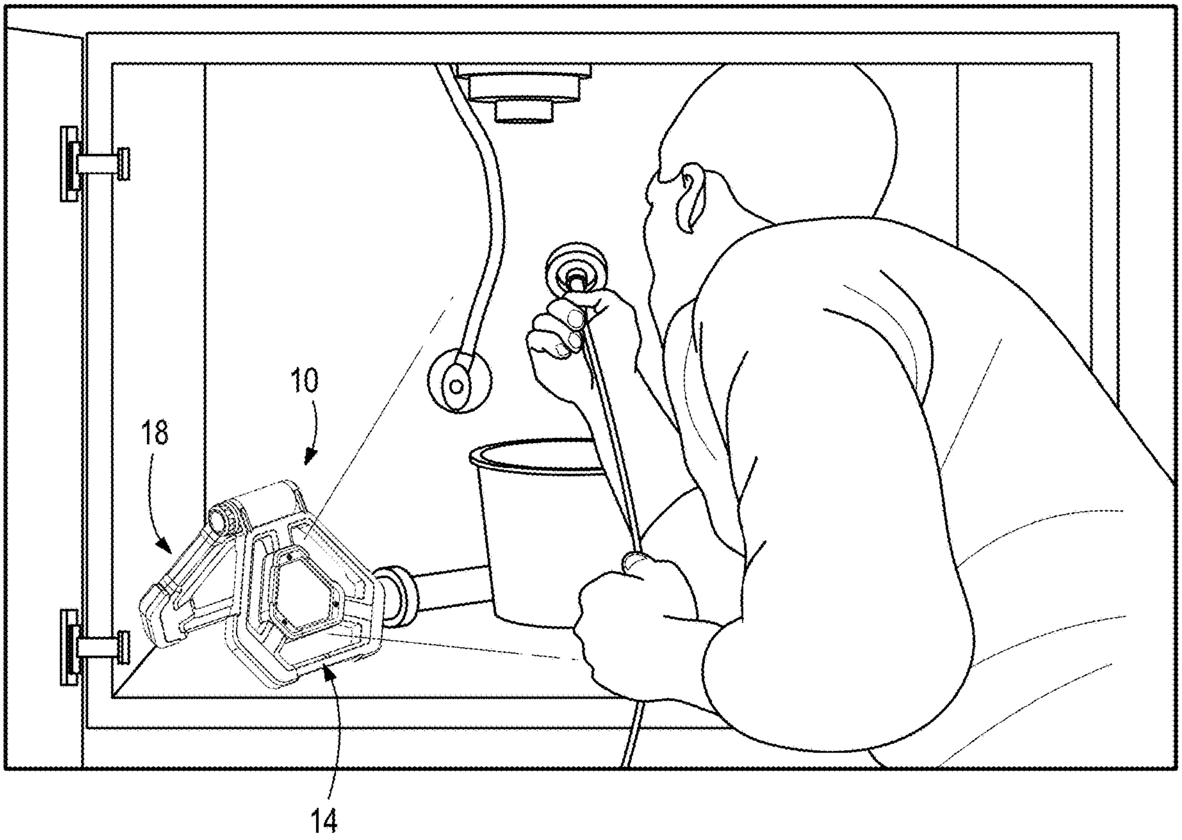
FIG. 10 is a perspective view of the light unit used in yet another exemplary application.

In yet another application, as illustrated in FIG. 10, the light unit 10 may be used in a non-vehicular workspace. Examples of a non-vehicular workspaces include, but are not limited to, a woodworking stand, an automotive body shop, and construction sites. In the non-vehicular workspace, with reference to FIGS. 1 and 10, the light unit 10 may be used in the collapsed position (FIG. 5A), the full pivot position (FIG. 5B), and an infinite number of deployed positions between the collapsed position (FIG. 5A) and the full pivot position (FIG. 5B). Specifically, the light unit 10 may be adjusted to any position in which the first light emitting direction A1 extends at least partially through the non-vehicular workspace such that the first LEDs 62 (FIG. 3) emit light directly onto the workspace. In some applications, the light unit 10 may be hung from a height relative to the workspace. For example, a cord may be fed through one of the plurality of apertures 50*a*, 50*b*, 50*c* of the work light 14 and secured to an overhead beam or pipe to suspend the light unit 10 at a desired height. Once the light unit 10 is positioned in a desired orientation, the light unit 10 may be set in one of the 15 different modes of operation. In the non-vehicular workspace, there may be no need to indicate a hazard, so the light unit 10 may, for example, be set in a mode in which the hazard light 18 is off.

Although applications of the light unit 10 have been described with regard to the vehicle 8 and non-vehicular workspaces 5*b*, it is understood that the light unit 10 may be used in any number of applications and workspaces in which illumination is desired. Specifically, the light unit 10 may be adjusted to any deployed position (e.g., illustrated in FIG. 5B) and set to any of the 15 different modes based on situational needs of a user. For example, other uses of the light unit 10 include, but are not limited to, oversized load warnings, recreational uses, emergency preparedness situations, long-haul trucking, towing, and emergency services. In oversized load warnings, the light unit 10 may be used to indicate a hazard from the rear of a vehicle while a user operates the vehicle to tow or haul large loads. In recreational uses, the light unit 10 may be used to illuminate, for example, a campsite or tent. In emergency preparedness applications, the light unit 10 may used to illuminate an area in situations in which power is lost in a home or building. In long-haul trucking applications, multiple light units 10 may set up in succession along a distance from a stopped semi-truck to provide a hazard indication that is visible from further away than through use of a single light unit 10. In towing application, the light unit 10 may be set up to provide a hazard indication for a tow truck as a tow truck operator tows a vehicle, for example, on the side of the road. In emergency services applications, maintenance and construction workers may set up light units 10 a distance from a service area to provide a hazard indication of the service area. The battery 98 of the light unit 10 may also be separately used to provide power to other electrical systems than the work light 14 and the hazard light 18. For example, the battery 98 may be used as a portable power source to provide power to charge a mobile phone.

While the disclosure has been presented with respect to a limited number of examples, those skilled in the art, having benefit of this disclosure, will appreciate other examples may be devised which do not depart from the scope of the present disclosure.

Clause 1. A light unit comprising: a work light configured to emit light in a first direction; a hazard light configured to emit light in a second direction; a hinge coupled between the work light and the hazard light such that the work light and the hazard light are independently rotatable relative to each other about the hinge from a storage position to a deployed position; a user interface disposed on the hazard light, the user interface including a work light actuator engageable to actuate the work light and a hazard light actuator engageable independent from the work light actuator to actuate the hazard light.

Clause 2. The light unit of clause 1, wherein the hazard light is rotatable approximately 200 degrees relative to the work light from the storage position.

Clause 3. The light unit of clause 2, wherein the storage position is defined by the work light and the hazard light in a back-to-back arrangement.

Clause 4. The light unit of clause 1, wherein the hinge defines a cavity configured to receive a battery configured to provide power to each of the work light and to the hazard light.

Clause 5. The light unit of clause 1, wherein the work light actuator includes at least two work light modes, and wherein the hazard light actuator includes at least two hazard light modes separate from the work light modes.

Clause 6. The light unit of clause 5, wherein the at least two work light modes include two or more of a low intensity mode, a medium intensity mode, and a high intensity mode.

Clause 7. The light unit of clause 5, wherein the at least two hazard light modes include two or more of a steady mode, a flash mode, and a tracer mode.

Clause 8. The light unit of clause 1, wherein the work light includes a first frame and the hazard light includes a second frame different from the first frame, and wherein at least one of the first frame and the second frame includes a magnet.

Clause 9. The light unit of clause 1, wherein only the work light includes an aperture configured to be gripped by a user.

Clause 10. The light unit of clause 1, wherein the hazard light further includes a circuit board electrically coupled to the work light and the hazard light, wherein the circuit board is configured to control an output of each of the work light and the hazard light.

Clause 11. The light unit of clause 10, wherein the circuit board further comprises a user interface including a work light actuator and a hazard light actuator disposed only on the work light or the hazard light.

Clause 12. The light unit of clause 11, wherein the circuit board is a first circuit board and the light unit further comprises a second circuit board electrically coupled between first circuit board and the work light and a third circuit board electrically coupled between the first circuit board and the hazard light.

Clause 13. A light unit comprising: a work light including a first hinge portion through which a pivot axis extends; and a hazard light including a second hinge portion rotatably coupled to the first hinge portion about the pivot axis; wherein the first hinge portion and the second hinge portion cooperatively define a cavity configured to receive a power source to power each of the work light and the hazard light.

Clause 14. The light unit of clause 13, wherein each of the work light and hazard light is pivotable about the pivot axis up to approximately 200 degrees from a storage position in which the work light and the hazard light are in a back-to-back arrangement.

Clause 15. The light unit of clause 13, further comprising a first circuit board electrically coupled to the work light and a second circuit board coupled to the hazard light.

Clause 16. The light unit of clause 15, wherein the first circuit board includes a user interface including a work light actuator and a hazard light actuator disposed only on the work light or the hazard light.

Clause 17. The light unit of clause 15, further comprising a second circuit board electrically coupled between the first circuit board and the work light and a third circuit board electrically coupled between the first circuit board and the hazard light.

Clause 18. A light unit comprising: a work light fixture including: a work light frame defining a plurality of frame segments and at least one aperture formed between the frame segments; a first LED disposed at a center portion of the frame segments; and a first hinge portion coupled to at least one of the plurality of frame segments; and a hazard light fixture including: a hazard light frame having a second hinge portion pivotably coupled to the first hinge portion, the hazard light frame further having a first portion defining an outer periphery of the hazard light frame and a second portion spaced from the first portion toward a center of the hazard light frame; a channel defined between the first portion and the second portion; a second LED disposed within the channel; and a circuit board supported by the second portion, the circuit board configured to control an output of each of the first LED and the second LED; wherein the first hinge portion and the second hinge portion cooperatively define a cylindrical body configured to receive a power source.

Clause 19. The light unit of clause 18, wherein the circuit board includes a user interface having a work light actuator and a hazard light actuator that are independently actuatable to control the work light and the hazard light.

Clause 20. The light unit of clause 19, wherein the work light actuator is configured to switch the work light between at least two different work light modes, and wherein the hazard light actuator is configured to switch the hazard light between at least two different hazard light modes.

The invention claimed is:

1. A light unit comprising:

a work light configured to emit light in a first direction;

a hazard light configured to emit light in a second direction;

a hinge coupled between the work light and the hazard light such that the work light and the hazard light are independently rotatable relative to each other about the hinge from a storage position to a deployed position;

a user interface including a work light actuator engageable to actuate the work light and a hazard light actuator engageable independent from the work light actuator to actuate the hazard light; and a circuit board electrically coupled to the work light and the hazard light, and the circuit board configured to control an output of each of the work light and the hazard light via the user interface, wherein the user interface is disposed only on the work light or the hazard light.

2. The light unit of claim 1, wherein the hazard light is rotatable approximately 200 degrees relative to the work light from the storage position.

3. The light unit of claim 2, wherein the storage position is defined by the work light and the hazard light in a back-to-back arrangement.

4. The light unit of claim 1, wherein the hinge defines a cavity configured to receive a battery configured to provide power to each of the work light and to the hazard light.

5. The light unit of claim 1, wherein the work light actuator includes at least two work light modes, and wherein the hazard light actuator includes at least two hazard light modes separate from the work light modes.

6. The light unit of claim 5, wherein the at least two work light modes include two or more of a low intensity mode, a medium intensity mode, and a high intensity mode.

7. The light unit of claim 5, wherein the at least two hazard light modes include two or more of a steady mode, a flash mode, and a tracer mode.

8. The light unit of claim 1, wherein the work light includes a first frame and the hazard light includes a second frame different from the first frame, and wherein at least one of the first frame and the second frame includes a magnet.

9. The light unit of claim 1, wherein only the work light includes an aperture configured to be gripped by a user.

10. The light unit of claim 1, wherein the circuit board is a first circuit board and the light unit further comprises a second circuit board electrically coupled between the first circuit board and the work light and a third circuit board electrically coupled between the first circuit board and the hazard light.

11. A light unit comprising:

a work light including a first hinge portion through which a pivot axis extends;

a hazard light including a second hinge portion rotatably coupled to the first hinge portion about the pivot axis;

a first circuit board electrically coupled to the work light and including a user interface having a work light actuator and a hazard light actuator, the user interface disposed only on the work light or the hazard light; and a second circuit board coupled to the hazard light;

wherein the first hinge portion and the second hinge portion cooperatively define a cavity configured to receive a power source to power each of the work light and the hazard light.

12. The light unit of claim 11, wherein each of the work light and hazard light is pivotable about the pivot axis up to approximately 200 degrees from a storage position in which the work light and the hazard light are in a back-to-back arrangement.

13. The light unit of claim 11, further comprising a third circuit board electrically coupled between the first circuit board and the work light, wherein the second circuit board is electrically coupled between the first circuit board and the hazard light.

14. A light unit comprising:

a work light fixture including:

a work light frame defining a plurality of frame segments and at least one aperture formed between the frame segments;

a first LED disposed at a center portion of the frame segments; and a first hinge portion coupled to at least one of the plurality of frame segments; and a hazard light fixture including:

a hazard light frame having a second hinge portion pivotably coupled to the first hinge portion, the hazard light frame further having a first portion defining an outer periphery of the hazard light frame and a second portion spaced from the first portion toward a center of the hazard light frame;

a channel defined between the first portion and the second portion;

a second LED disposed within the channel; and a circuit board supported by the second portion, the circuit board configured to control an output of each of the first LED and the second LED;

wherein the first hinge portion and the second hinge portion cooperatively define a cylindrical body configured to receive a power source.

15. The light unit of claim 14, wherein the circuit board includes a user interface having a work light actuator and a hazard light actuator that are independently actuatable to control the work light and the hazard light.

16. The light unit of claim 15, wherein the work light actuator is configured to switch the work light between at least two different work light modes, and wherein the hazard light actuator is configured to switch the hazard light between at least two different hazard light modes.

* * * * *